A. LEPPERT.
WAVE AND WIND POWER GENERATOR.
APPLICATION FILED JUNE 14, 1915.

1,204,366.

Patented Nov. 7, 1916.
5 SHEETS—SHEET 1.

Inventor,
Adolph Leppert.
By Attorney G. H. Davis

A. LEPPERT.
WAVE AND WIND POWER GENERATOR.
APPLICATION FILED JUNE 14, 1915.

1,204,366.

Patented Nov. 7, 1916.
5 SHEETS—SHEET 5.

Inventor,
Adolph Leppert.
By Attorney G. H. Davis

UNITED STATES PATENT OFFICE.

ADOLPH LEPPERT, OF BROOKLYN, NEW YORK.

WAVE AND WIND POWER GENERATOR.

1,204,366.

Specification of Letters Patent.   Patented Nov. 7, 1916.

Application filed June 14, 1915.   Serial No. 33,837.

*To all whom it may concern:*

Be it known that I, ADOLPH LEPPERT, a citizen of the United States, residing at Brooklyn, in the county of Kings and State of New York, have invented certain new and useful Improvements in Wave and Wind Power Generators, of which the following is a specification.

This invention relates to means for converting the energy of natural forces into power available for industrial purposes, and has reference more particularly to apparatus for producing power by means of the combined action of wind and waves.

One object of the invention is to provide apparatus of this character having improved means for utilizing the back and forth movement or roll of the water on the seashore for operating a pump for elevating such water.

Another object is to combine with such means auxiliary mechanism operated by the up and down movement of the waves.

A further object is to provide in combination with the above mentioned mechanism, novel means for catching or impounding water forming the crest of incoming waves.

A still further object is to provide an improved wind motor or air turbine to be used for pumping to a higher level the water elevated and impounded by the means above mentioned.

In order that the invention may be readily understood, reference is had to the accompanying drawings, forming part of this specification, and in which—

Figure 1:
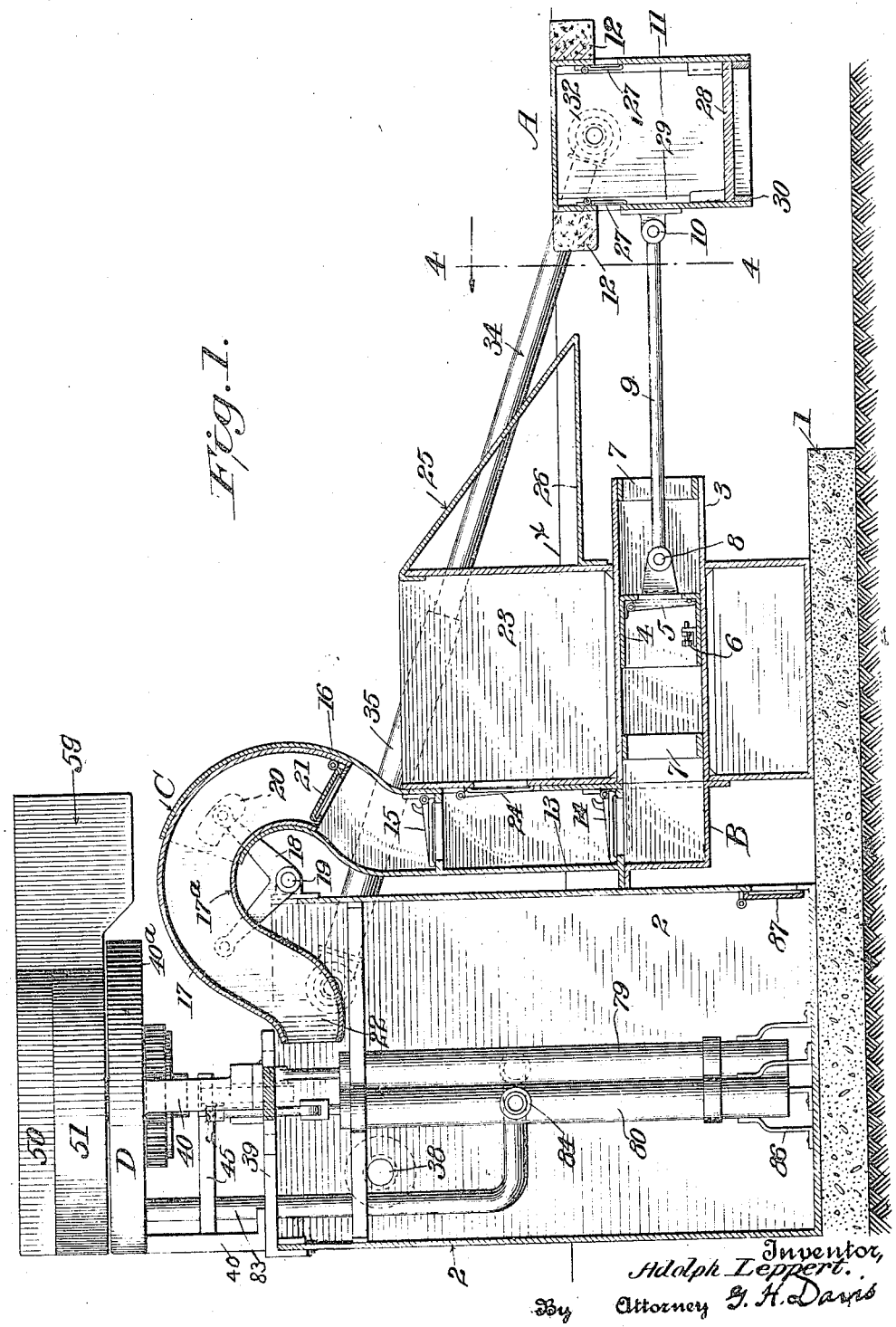
Figure 2:
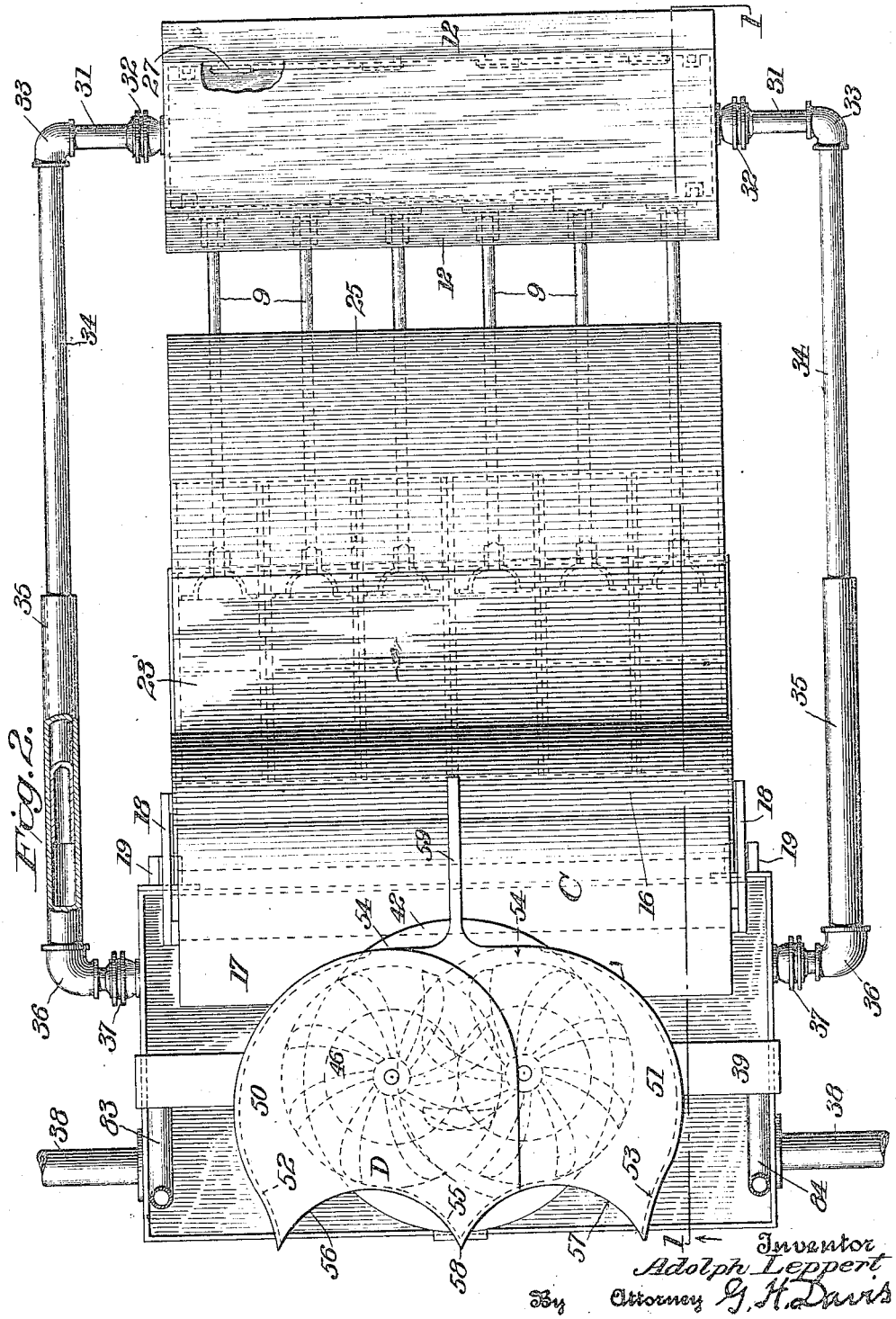
Figure 3:
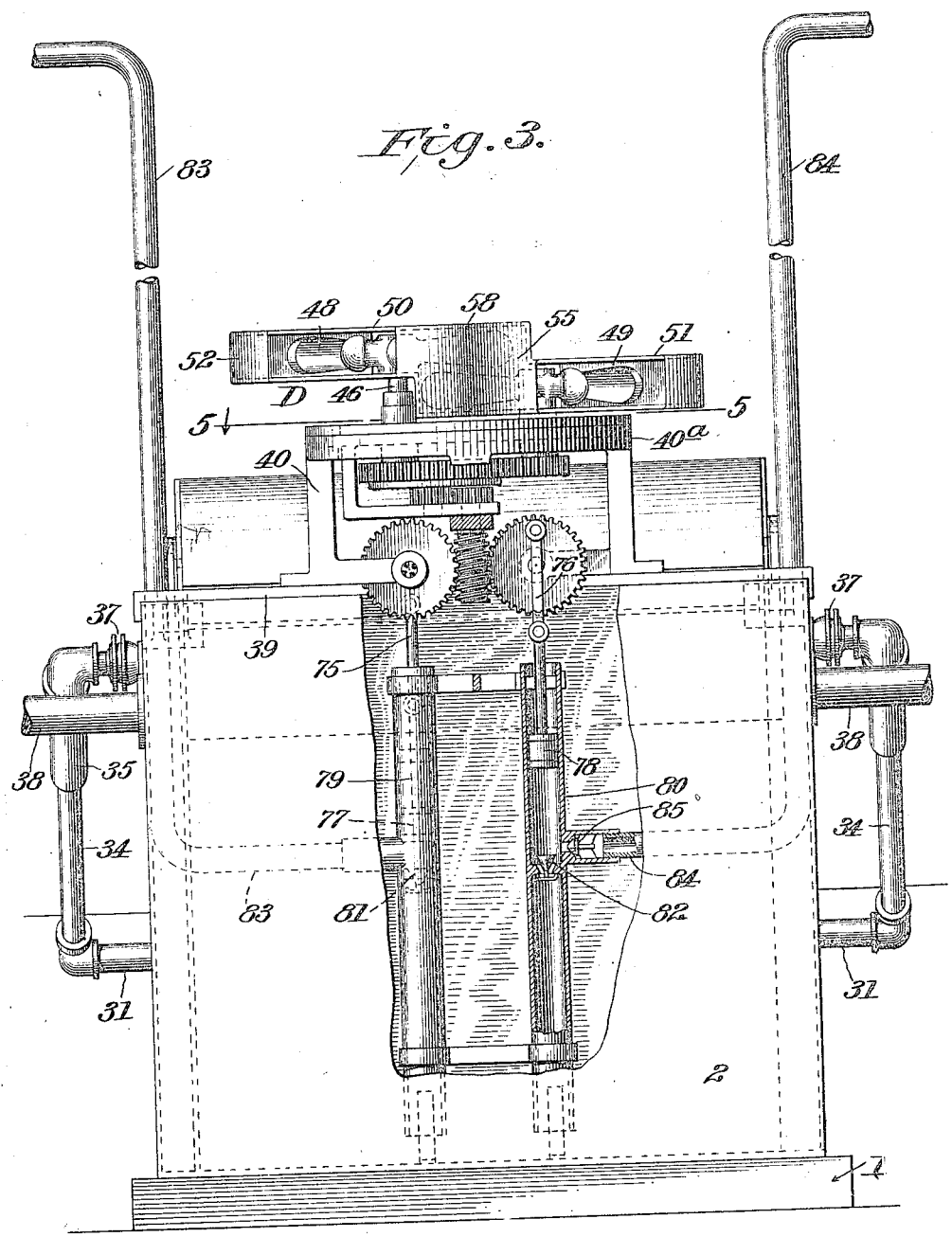
Figure 4:
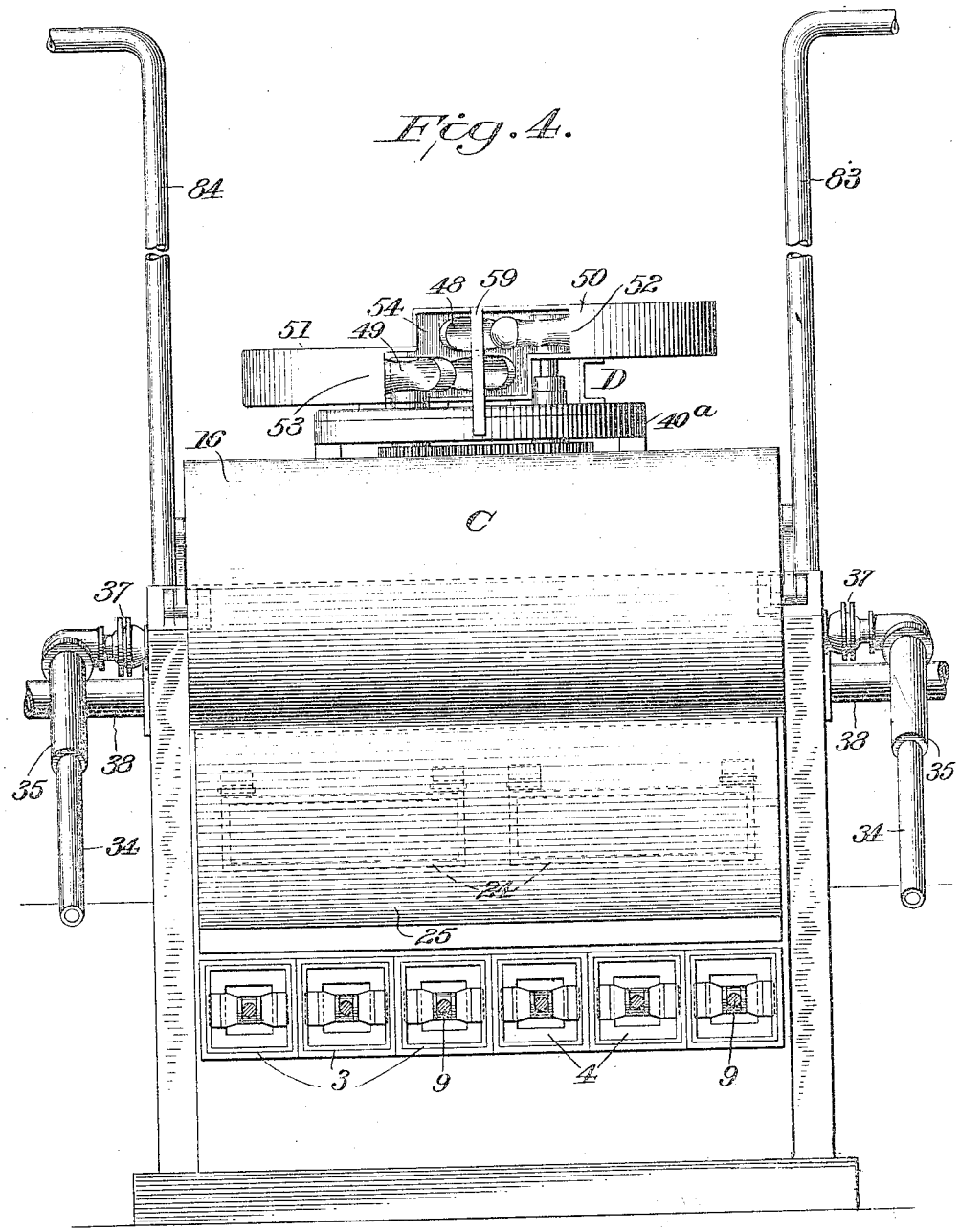
Figure 5:
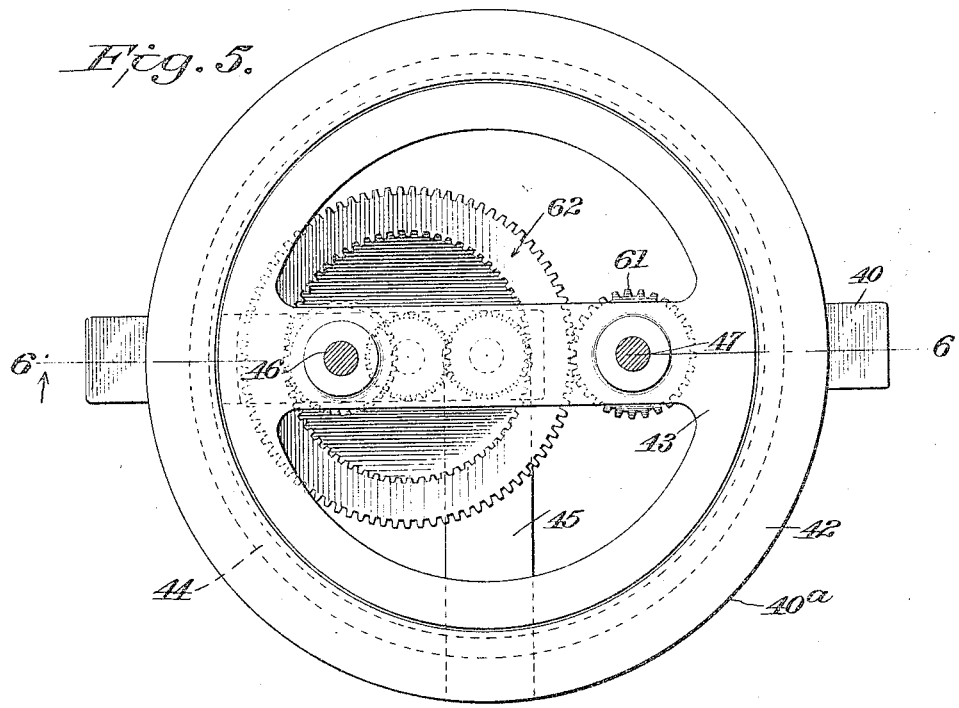
Figure 6:
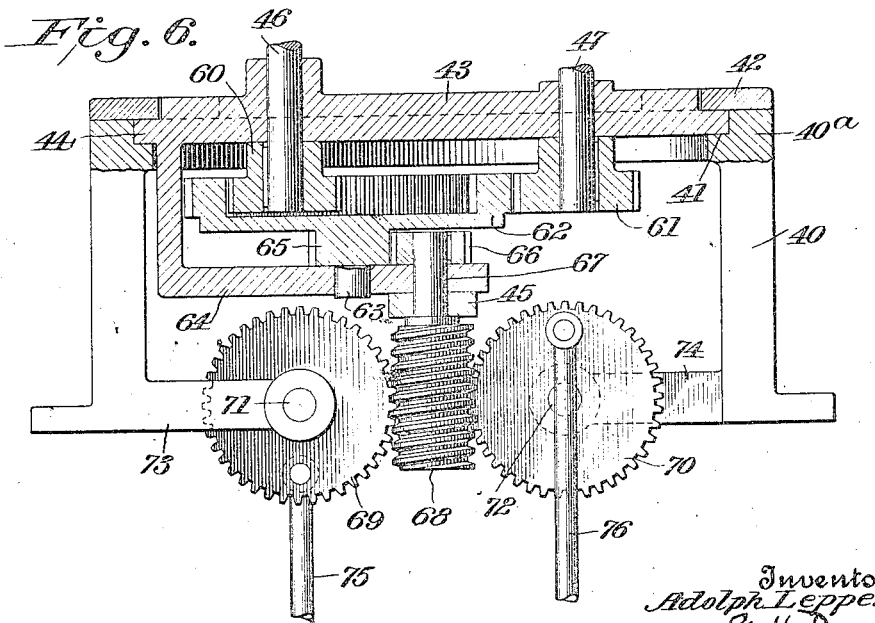

Figure 1 is a sectional elevation of my complete apparatus, the section being taken substantially on the line 1—1 of Fig. 2; Fig. 2 is a plan view of the apparatus, parts being in section; Fig. 3 is a rear view of the machine, parts being broken away and parts shown in section; Fig. 4 is a front elevation, parts being in section on the line 4—4 of Fig. 1, looking in the direction of the arrow; Fig. 5 is an enlarged detail sectional view of the wind motor, the section being taken on the line 5—5 of Fig. 3; and Fig. 6 is a section on the line 6—6 of Fig. 5, looking in the direction of the arrow.

Referring to the drawings in detail, my improved apparatus may be mounted upon a suitable base 1, formed of concrete or the like, and located upon the seashore. The apparatus comprises a tank or reservoir 2, of comparatively large size, and open at the top. In connection with this reservoir, I employ main pumping apparatus B, floating or auxiliary pumping apparatus A, a sucker device C, and a wind motor or air turbine D.

The main pumping mechanism consists of a plurality of cylinders 3, arranged side by side, and suitably supported on the base 1. As shown in Fig. 4, these cylinders are preferably rectangular in cross section. In each of the cylinders 3 works a piston 4, fitted with a check valve 5, preferably of the flapper type, and provided with an adjustable stop 6, for limiting its movement. Stop rings 7 are fitted in the cylinder 3 on either side of the piston 4 to limit its movement.

A connecting rod or link 9 is provided for each cylinder, and has one end pivotally connected at 8 to the piston 4, and its other end pivotally connected at 10 to the float A. This float consists of a hollow body or box 11, having adjacent its upper edges buoyant members 12, which may be formed either of cork or the like, or of hollow sheet metal. The object of these buoyant members is, of course, to support the float A with its top substantially flush with the water level, as indicated by the line x.

Extending upwardly from the rear end of the cylinders 3 is a stand pipe or conduit 13, communicating with said cylinders through a series of upwardly opening check valves 14. Near its top is provided a second series of upwardly opening check valves 15. Above the valves 15, the conduit assumes a curved form, as indicated at 16, and constitutes part of the device C now to be described. This device comprises a substantially semicircular curved conduit 17, the rear end of which telescopes within the curved portion 16 of the stand pipe. The conduit 17 is movable and is supported at each end by a bracket 18, pivoted at 19 to a suitable support, such as the reservoir 2. The ends of the curved portion 16 are slotted, as indicated at 20, to permit of free movement of the brackets 18. At its inner or forward end the conduit 17 carries one or more upwardly opening check valves 21, and the opposite end of the conduit is turned slightly upward, as indicated at 22.

Above the pump cylinders 3 is an open top catch tank 23, having one or more outwardly opening check valves 24 carried by its rear wall and controlling communication between said tank and the stand pipe 13 at a point between the valves 14 and 15. Extending downwardly and forwardly from the top of the tank 23 is an inclined plane or breakwater 25. This is preferably formed of sheet metal, which is bent rearwardly at its lower edge and extends back to the tank so as to form a brace 26, as clearly shown in Fig. 1.

The float box 11 is provided with a plurality of inwardly opening check valves 27, and also has a movable bottom 28, which is capable of sliding vertically on guideways 29, formed inside of the box. The downward movement of the bottom 28 is limited by a stop strip 30.

Connected with each end of the box 11 by means of a swiveled joint 32 is a pipe nipple 31, to the outer end of which an elbow 33 is secured. In each of these elbows is screwed one end of a pipe 34. The other ends of the pipes 34 snugly fit and telescope within another pair of pipes 35, which are in turn secured to elbows 36. These elbows are connected with the reservoir 2 by means of swiveled joints 37. It will thus be seen that by virtue of the swiveled joints 32 and 37, as well as the pivotal connections 8 and 10, the float A is free to rise and fall with the waves, while owing to the slip connection between the pipes 34 and 35, such float is capable of a back and forth movement toward and from the machine, in accordance with the ebb and flow of the water. The operation of the apparatus so far described is therefore obvious. The back and forth movement of the float A operates the pistons 4, and thus causes them to pump water into the stand pipe 13 and force it up such pipe. At the same time, any up and down movement which the bottom 28 of the float box may have will cause such bottom to act as a pump piston, and, by virtue of the valves 27, force water up through the pipes 34 and 35 into the reservoir 2. Moreover, incoming waves will break against the device 25 so that water will be forced up the incline and become impounded in the catch tank 23. From this tank it can flow to the stand pipe through the valves 24. As the water rises in the stand pipe it will finally reach such a height that it flows over the highest point 17ª of the conduit 17, and downwardly through the end 22 of such conduit into the reservoir.

From the reservoir 2, pipes 38 extend to supply water to low pressure fire mains, or for other purposes as may be desired.

In order to supply water at still higher pressure for various uses that may be required, I provide special pumping apparatus operated by means of the air turbine D. This apparatus is preferably supported upon the reservoir 2 by means of a frame 39.

Resting upon this frame is another frame comprising uprights 40, supporting at their upper end an annular ring 40ª. Upon the inside of this ring 40ª is formed an annular groove 41. A circular frame 43 is provided with an annular flange 44 which rests in the groove 41 and is retained in position therein by means of a removable ring or flange 42, which is secured to the ring 40ª.

Journaled in the frame 43 is a pair of vertical shafts 46 and 47, to the upper ends of which are secured air turbines 48 and 49 of improved construction. It will be seen that each of these turbines has a plurality of curved, substantially radial, concavo-convex blades, each of the turbines being horizontally disposed, but one lying slightly above and overlapping the other, as clearly shown in Figs. 2, 3, and 4. Inclosing the turbine 48 is a housing 50, and inclosing the turbine 49 is a similar housing 51. The housing 50 is provided with an outside wall 52, and the housing 51 with an outside wall 53, said walls terminating at a point removed from the center of the apparatus so as to leave an open space 54 therebetween. (See Fig. 2.) The housings 50 and 51 are further provided, on the windward side, with a common uniting wall 55, which is so shaped as to form a peak or wedge 58 at a point midway between the centers of the two turbines. As clearly shown in Fig. 3, this wall 55 extends only about half the width of each turbine so that open spaces 56 and 57 are formed at each side thereof. The walls 52 and 53 of the turbine housings adjacent the openings 56 and 57 are flared slightly outward, as shown in Fig. 2, so as to more effectively catch the wind. It will be apparent that wind blowing from the left, as seen in Fig. 2, will enter the openings 56 and 57 and impinge upon the concave sides of the curved blades, thus driving the turbine wheels in opposite directions, the wind finally escaping through the opening 54 on the leeward or right hand side, as seen in Fig. 2.

In order to properly turn the housing so as to cause the openings 56 and 57 to always face the wind, I provide a tail or vane 59, rigidly attached to the housings. It will be seen that since the turbines and housings are carried by the frame 43, this entire frame is turned by the vane 59, so as to keep the turbines always faced in the right direction, the flange 44 sliding in the groove 41 during such turning movements.

To the lower ends of the shafts 46 and 47, respectively, and beneath the frame 43, are secured pinions 60 and 61, which respectively mesh with internal and external teeth formed upon an annular gear 62. This gear 62 is provided with a stub shaft 63, which turns freely in an arm 64, carried by the frame 43.

The gear 62 has formed integral therewith and between itself and the stub shaft 63, a pinion 65, and this pinion meshes with a pinion 66, secured to the upper end of a stub shaft 67. The shaft 67 extends downwardly through and is journaled in the arm 64, and also an arm 45 carried by one of the uprights 40 and serving to brace the gearing and render the mechanism more rigid. It will also be noted that this shaft 67 forms a center about which the frame 43 and associated parts turn, the pinion 65 merely traveling around the pinion 66 as the frame rotates.

The shaft 67 carries at its lower end a worm 68, which meshes with a pair of worm wheels 69 and 70, pivotally mounted at 71 and 72, respectively, in arms 73 and 74, forming part of the frame 40. Pivotally attached to the wheels 69 and 70 are connecting rods 75 and 76, respectively, which rods extend downwardly into the reservoir 2, and are connected with pump pistons 77 and 78. The pistons 77 and 78, respectively, work in pump cylinders 79 and 80, which are open at their lower ends adjacent the bottom of the reservoir 2, being supported by suitable brackets 86, and are provided with upwardly opening check valves 81 and 82. From the pump cylinders 79 and 80 extend high pressure pipes 83 and 84, which may discharge water into elevated tanks or into a distribution system of any kind. Each of these pipes is, of course, provided with a check valve 85 at its junction with the pump. High pressure water from the pipes may be used for operating turbines for electrical generation, or other power purposes.

An inwardly opening check valve 87 is preferably provided near the bottom of the reservoir 2, so that the outside water can flow into the pumps 79 and 80 if, under any circumstances, the wave operated apparatus should fail to feed sufficient water into the reservoir.

What I claim is:

1. Apparatus of the class described, comprising a reservoir, a pump having a stationary horizontally disposed cylinder, a vertically extending conduit through which water from said pump may be discharged into said reservoir, a float, and a pivoted link connection between said pump and float whereby the back and forth movement thereof, due to the ebb and flow of the water, serves to operate said pump, and whereby said float is free to rise and fall with the varying level of the water.

2. Apparatus of the class described, comprising a reservoir, a stationary pump, a conduit extending from the pump and discharging into the reservoir, a float, means whereby the said pump is operated by movements of the float, and a catch tank arranged to discharge its contents into said conduit, between said pump and said reservoir.

3. Apparatus of the class described, comprising a fixed reservoir, a stationary horizontally disposed pump, a float operatively connected therewith, a conduit for discharging water from said pump into said reservoir, a second pump carried by said float and operated by the vertical movement of the water thereunder, and a discharge pipe extending from said second pump to said reservoir.

4. In a device of the class described, the combination with a reservoir of a float, said float comprising a hollow boxlike body provided with check valves and having a vertically movable bottom, and a pipe connecting said body with said reservoir whereby vertical movements of said bottom coöperate with the said valves to force water through said pipe into said reservoir.

5. In a device of the class described, the combination with a reservoir of a pump arranged to deliver water into the same, a float, an operative connection between said float and pump whereby horizontal movements of the former operate the latter, said float being also capable of vertical movements and a pump carried by said float and operated by the vertical movements thereof, said second pump also delivering water into said reservoir.

6. In a device of the class described, the combination with a relatively high reservoir, of a relatively low open catch tank located adjacent thereto, said tank having an inclined breakwater extending downwardly from the upper edge thereof, said breakwater being so arranged as to cause incoming waves to deposit water in said tank, and means for transferring water impounded in said tank to said reservoir.

In testimony whereof I have affixed my signature.

ADOLPH LEPPERT.